(No Model.)　　　　　G. L. TURCOTT.　　2 Sheets—Sheet 1.
HORSESHOE.

No. 477,476.　　　　　　Patented June 21, 1892.

Witnesses:　　　　　　　　　　　　Inventor:
Jas. E. Hutchinson.　　　　　　　Gideon L. Turcott, by
Henry C. Hazard.　　　　　　　　Crindle and Russell, his Attys.

THE NORRIS PETERS CO., PHOTO-LITHO., WASHINGTON, D. C.

(No Model.) 2 Sheets—Sheet 2.

G. L. TURCOTT.
HORSESHOE.

No. 477,476. Patented June 21, 1892.

Witnesses:
Jas. E. Hutchinson.
Henry C. Hazard.

Inventor.
Gideon L. Turcott. by
Rindle and Russell, his Attys

UNITED STATES PATENT OFFICE.

GÉDÉON L. TURCOTT, OF NEWPORT, ASSIGNOR TO JAMES R. CUTTING, OF NEWPORT CENTRE, VERMONT.

HORSESHOE.

SPECIFICATION forming part of Letters Patent No. 477,476, dated June 21, 1892.

Application filed December 12, 1889. Serial No. 333,491. (No model.)

*To all whom it may concern:*

Be it known that I, GÉDÉON L. TURCOTT, of Newport, in the county of Orleans, and in the State of Vermont, have invented certain new and useful Improvements in Horseshoes; and I do hereby declare that the following is a full, clear, and exact description thereof, reference being had to the accompanying drawings, in which—

Figure 1:
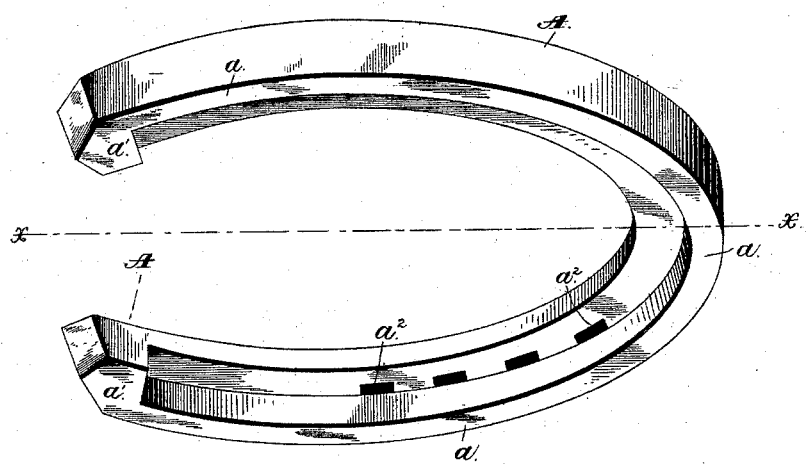
Figure 2:
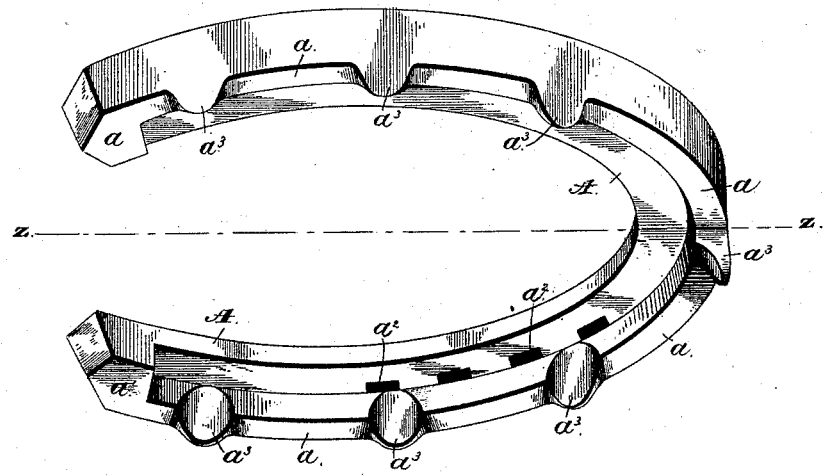
Figure 3:
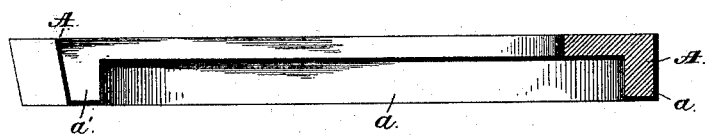
Figure 4:
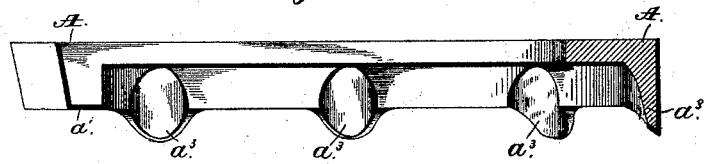

Figure 1 is a perspective view of my improved horseshoe as used for smooth shoeing. Fig. 2 is a like view of the same when provided with calks; and Figs. 3 and 4 are cross-sections upon lines $x\,x$ and $z\,z$, respectively, of Figs. 1 and 2.

Letters of like name and kind refer to like parts in each of the figures.

The object of my invention is to provide a horseshoe which, while primarily adapted for smooth shoeing, shall be capable of being readily and cheaply sharpened when desired; and to that end such invention consists principally in a horseshoe which is provided upon its lower face with a marginal flange that projects downward, substantially as and for the purpose hereinafter specified.

It consists, further, in a horseshoe which is provided upon its lower face with a downward-projecting marginal flange and at each end has a lug or bearing that corresponds in height to and forms a lateral extension of such flange, substantially as and for the purpose hereinafter shown.

It consists, finally, in a horseshoe which is provided upon its lower face with a downward-projecting marginal flange that at suitable points has wedge-shaped projections or calks, which are formed by drawing downward the metal of such flange, substantially as and for the purpose hereinafter set forth.

In the carrying of my invention into practice I construct a horseshoe A, which in plan view has the desired size and shape and upon its lower face is provided with a marginal flange $a$, that projects downward and gives to the shoe an L shape in cross-section. Said flange may have a uniform thickness along its entire length, but is preferably made thicker at its rear ends, so as to produce at such points broad bearings $a'$ and $a'$, as shown.

The body or horizontal portion A of the shoe is provided with the usual holes $a^2\,a^2$, &c., for the passage of fastening-nails and as constructed is adapted for use in smooth shoeing or for all occasions, except when the ground is frozen hard and not covered with snow or when a horse is to travel upon ice.

The flange $a$ has an outward and downward inclination of its inner side, so that when used in the snow there will occur none of the balling which in ordinary shoes is so frequent and objectionable, as the shoe is cleared from the snow the instant that the hoof of its wearer is raised.

When it is necessary that a horse shall be sharp shod, the shoe is removed and, after heating, has the inner face of its flange placed upon the horn of an anvil, and by means of a few blows of a hammer upon its outer side the metal at such point is drawn downward, so as to produce a calk $a^3$, which in side elevation has a semicircular form and in cross-section is wedge-shaped, with its outer face vertical and its inner face inclined, as shown.

For an ordinary size of shoe I generally form seven of the calks; but any desired number (more or less) may be formed, and when from use they become worn new calks may be formed from the metal of the flange adjacent to each, there being usually sufficient metal to enable three and sometimes four sets of calks to be successively formed upon each shoe, by which means its usefulness is materially greater than that of shoes of ordinary construction.

Having thus described my invention, what I claim is—

1. A horseshoe having a downwardly-projecting flange from which project calks formed by portions drawn down therefrom, substantially as and for the purpose specified.

2. A horseshoe having a downwardly-projecting flange from which project calks formed by portions drawn down therefrom and at intervals apart to allow the subsequent formation of other calks from such flange, substantially as and for the purpose set forth.

3. A horseshoe having a downwardly-projecting flange from which project calks formed by portions drawn down therefrom, the lower ends of said calks being sharpened and formed on lines that curve in vertical planes, substantially as and for the purpose specified.

In testimony that I claim the foregoing I have hereunto set my hand this 2d day of November, 1889.

GÉDÉON L. TURCOTT.

Witnesses:
HOMER THRASHER,
F. E. BEMIS.